Nov. 21, 1972   E. W. HAYCOCK ET AL   3,703,446
METHOD OF CARRYING OUT ELECTROCHEMICAL PROCESSES
IN A FLUIDIZED-BED ELECTROLYTIC CELL
Filed Feb. 8, 1968   2 Sheets-Sheet 1
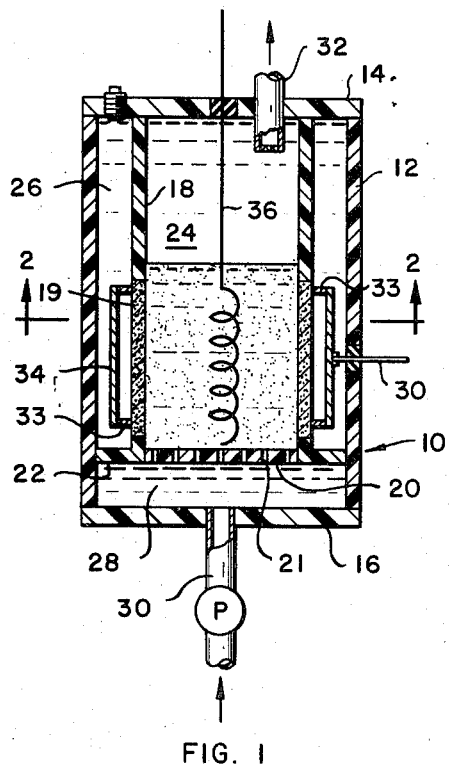
FIG. 1
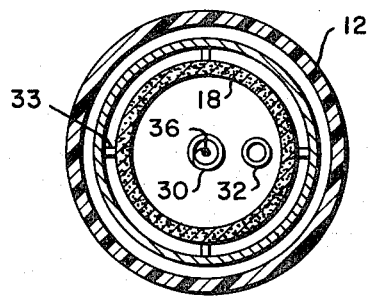
FIG. 2
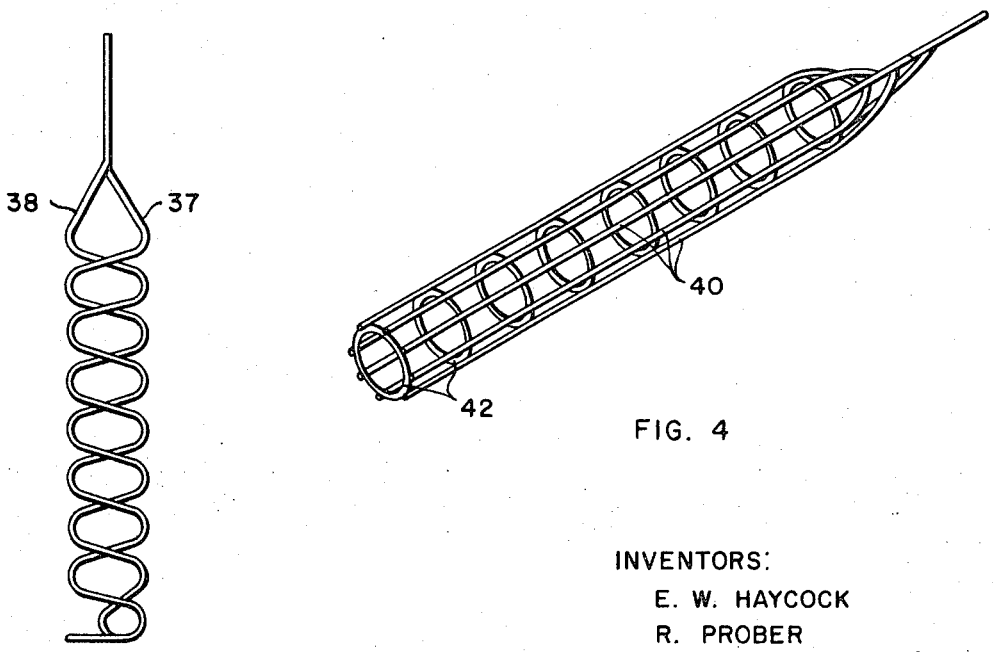
FIG. 3
FIG. 4
INVENTORS:
E. W. HAYCOCK
R. PROBER
BY: J. H. McCarthy
THEIR AGENT

INVENTORS:
E. W. HAYCOCK
R. PROBER

BY: A. H. McCarthy
THEIR AGENT

United States Patent Office 3,703,446
Patented Nov. 21, 1972

3,703,446
METHOD OF CARRYING OUT ELECTROCHEMICAL PROCESSES IN A FLUIDIZED-BED ELECTROLYTIC CELL
Ernest W. Haycock, El Cerrito, Calif., and Richard Prober, Trenton, N.J., assignors to Shell Oil Company, New York, N.Y.
Filed Feb. 8, 1968, Ser. No. 704,163
Int. Cl. B01k 3/00; C23b 5/00
U.S. Cl. 204—23
2 Claims

ABSTRACT OF THE DISCLOSURE

An electrolytic cell using an electrolyte and a particulate electrode in a fluidized condition to achieve a large, continuously depolarized electrode surface area.

CROSS-REFERENCE TO A RELATED APPLICATION

The board concept of using a particulate electrode to increase electrode surface area and continuously maintain highly efficient depolarized electrode surfaces for electro-chemical reactions is broadly covered in copending patent application Ser. No. 840,195 that is a continuation-in-part of patent application Ser. No. 168,961, filed Jan. 26, 1962.

BACKGROUND OF THE INVENTION

This invention broadly relates to a method and apparatus for operating electro-chemical processes using dispersed electrode particles, and more particularly to making a fluidized bed of the dispersed electrode particles.

Fluidized beds are well known in the chemical and petroleum industries. They are frequently used for catalysts in particulate form to increase the effective surface area and allow a unique degree of control with respect to continuous catalyst regeneration. Typically a fluid is passed through small holes in the bottom of a container at such a rate that solid particles in the chamber are suspended in a reasonably well defined bed. That is, the forces exerted on the particle by the fluid flow tends to balance the forces due to gravity.

The present invention, while in appearance somewhat similar to that of a standard fluidized bed, involves a new concept in which some of the hydrodynamic characteristics of fluidized bed are combined with the electrodynamic characteristics of an electrolytic cell. This fluidized bed cell is equipped with electrode elements so that the cell can either supply current, acting as a fuel cell, or consume current, in electrolytic processes.

One of the great attributes of the fluidized bed electrolytic cell is the added measure of control it supplies to electrodynamic processes by the hydrodynamics of the cell. Since the efficiencies of electrodynamic processes depend on certain physical relationships in the electrolytic cell, such as electrode surface area, adsorption of the reactant onto and, desorption of products from electrode surfaces and concentration polarization, as well as many other factors, this novel cell provides a new dimension in control of some of these factors.

In many electro-chemical processes it is desirable to have relatively large surface area for the electrodes in contact with the electrolyte. An obvious expedient to increase the effective surface area of electrodes would be to comminute them into a particulate form. If these electrodes in particulate form were placed in porous containers of insulating material, they would act much like a porous electrode when contacted with a conductive filament but would give somewhat poorer results because of the added internal resistance caused by the container. Concentration polarization would be difficult to avoid in such a situation, especially within the mass of the particles, i.e., the interstitial voids between particles. Thus, little could be gained by such a procedure and efficiencies could be sacrificed since the effective net surface area of the electrode would not be appreciably greater than that of a porous electrode. However, if the electrode particles are suspended in an electrolyte and can be made to contact a surface that will allow electron transfer and current flow to change the rest potential of the electrode particle, the maximum surface area of each particle can be used in electrochemical processes, giving vastly improved efficiencies relative to that particle. Each particle becomes a working electrode only during impaction with the charge transfer electrode. A relatively long time exists between impactions and depolarization can readily occur so that upon reimpaction the particle surface behaves as an ideally unpolarized electrode. This leads to greatly enhanced electrochemical reaction rates.

In order for a particulate electrode to be effective, it is necessary to achieve an electrical contact between the individual electrode particles and a conductive surface so that current flow to and from and through the particle can be established. The efficiency of the particulate electrode is dependent on such a contact; and to be efficient, the maximum number of contacts of the particles with the conductive surface is required. The problem of establishing these contacts between the individual particles and the parent, change transfer, electrode is critical and is limiting in the use of dispersed electrodes in electrochemical processes.

SUMMARY OF THE INVENTION

The above problem has been substantially overcome by the inventive concept of the fluidized bed electrolytic cell in which the electrodes are in particulate form. Broadly, the fluidized bed electrolytic cell consists of a first chamber with a bed of conductive particles in the bottom and a conductive parent electrode suspended within the first chamber and immersed in the bed of conductive particles by the fluidizing effect of an electrolyte that is passed upwardly through the bottom of the first chamber. A second chamber is separated from the first chamber by an ion-permeable membrane, and a conductive counter electrode is suspended within the second chamber. Electrical conductors are connected to each of the electrodes in such a way as to provide a circuit through which current may flow when the cell is in operation. A means is provided to flow the electrolyte through the bottom of the first chamber to maintain the bed of conductive particles in a fluidized condition.

A reactant material is mixed with the electrolyte and passed up through the bottom of the first chamber thus maintaining a plentiful supply of reactant at the particulate electrode surfaces. As the reactant material contacts particles in the bed, it becomes adsorbed on the particle surface and an electrochemical reaction takes place when the particle subsequently contacts the parent electrode. The electrochemical reaction can be used to drive electrical current through the external circuit. Alternatively, current supplied from an external source flowing through the circuit can cause an electrochemical reaction to form a desirable new product. It is the latter mode of operation to which this invention is directed. That is, the object is to form new products by the transfer of externally supplied electrons to reactant materials. The present invention has been found to be particularly useful in the manufacture of metal powders including both homogeneous metal powders and metal powders with layers of different metals. It can be seen that the initial electrode particles can be used as nucleation centers to grow any desired size particles. To manufacture metal powder, small metal particles are supplied to the fluidized bed electrolytic cell and large particles are removed. The concentration of pertinent metal ion is maintained at a desired level in the electrolyte by periodic or continuous addition. Where various metal compositions are to be deposited on the particle, either simultaneously or consecutively, as is often the case in the manufacture of catalysts for petrochemical reactions, the reaction material introduced through the bottom of the chamber is varied. Alternatively a series of cells can be used and metal layers of various composition grown in successive cells each charged with the appropriate electrolyte.

BRIEF DESCRIPTION OF THE DRAWINGS

The advantages and operation of the invention can be more fully understood from the following detailed description taken with reference to the accompanying drawing wherein:

FIG. 1 is a schematic drawing in vertical cross-section of one embodiment of the apparatus.

FIG. 2 is a view of the horizontal cross-section taken along line 2—2 in FIG. 1.

FIG. 3 is an illustration of a parent or charge transfer electrode in spiral form.

FIG. 4 is an illustration of a basket-shaped parent electrode.

DESCRIPTION OF THE PREFERRED EMBODIMENTS

Figure 5:
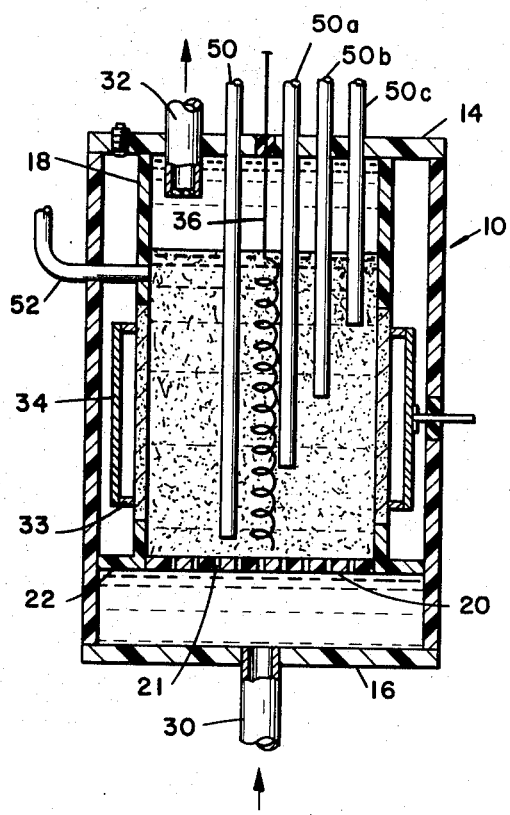
FIG. 5 is a view of a second embodiment of the subject apparatus in vertical cross-section.

Referring to FIGS. 1 and 2, a cylindrical housing 10 consists of an outer wall 12, a top 14, and a bottom 16. The housing may be of any cross-section, and a circular one is illustrated here only for convenience. The housing should be made of materials that are inert to the chemicals to be used therein, and should be made sufficiently hermetic to prevent the escape of typical electrolytes and electrolysis products.

Inside of the cylindrical housing, an inner cylindrical member 18 is hermetically attached to the top, extends downwardly therefrom to form sidewalls, and is provided with a bottom 20 having a plurality of small holes 21 extending therethrough to form an inner chamber. At the level of the bottom of the inner cylinder, a ring-shaped member 22 is hermetically attached to both the inner cylinder and the housing. It can be seen that the structure now defines a first or inner chamber 24, a second or outer chamber 26, and a bottom chamber 28. Satisfactory results can also be obtained by extending member 18 to bottom 16 and eliminating member 22.

The bottom chamber is provided with a conduit 30 through which the cell receives a supply of fluid electrolyte and reactant material. The inner chamber is provided with an outlet conduit 32 through which the electrolyte and reaction products are removed.

In the outer chamber is suspended a counter electrode 34 by suitable means, as by insulated posts 33, with an electrical lead 36 attached thereto and extending through the housing to the outside.

Inner cylinder 18 has a portion 19 thereof made of an ion-permeable material, a diaphragm or membrane having a porosity that allows the free passage of ions, but prevents the flow of electrode particles (to be described hereafter). For example, the inner cylinder may be made of sintered glass and the counter electrode may be made of a platinum foil sheet juxtaposed with the inner sintered glass cylinder.

Within the first chamber, there is suspended a parent electrode 36. FIGS. 3 and 4 show two novel parent electrode configurations. In accordance with the operation of the invention, it is essential to have the electrode particles make frequent contact with the parent electrode. To this end, studies were performed to determine the shapes and sizes of electrodes that tended to cause the most particle-electrode contacts. FIGS. 3 and 4 illustrate two electrode designs for which contacts were relatively high.

In FIG. 3, a spiral electrode consists of first wire 37 and a second wire 38 each wound into a helix, interlaced with each other, or convoluted, and electrically interconnected at top and bottom.

An alternative parent electrode is shown in FIG. 4. It will hereinafter be referred to as a basket-shaped electrode and consists of vertical strands of wire 40 connected by horizontal loops 42.

The parent electrode may be made of any conducting material that is substantially inert to the reactant material used. For example, a 90% platinum-10% rhodium alloy has been found useful in a variety of electrolytes.

As a means for providing a large surface area with which the reactant materials may come in contact, a bed of finely divided conductive particles is provided in the bottom of the first chamber. The particles may be of any size suitable for fluidization and will typically be between 10 and 500 microns. The electrode particles may be of any conductive material, and various materials will be used, depending upon the application. For example, in the manufacture of a catalyst, it may be desirable to start with particles of carbon and electroplate thereon a thin film of platinum or gold; and indeed it may be desirable to plate on several layers of different metals. Silver electrode particles have been found useful in electrochemically reacting some commercial chemicals.

In the manufacture of metal powders, the object is to start with a fluidized bed of very small particles of a metal and to electrochemically grow these particles to a size suitable for compaction or other metal powder applications. FIG. 5 shows an apparatus in which this may be conveniently carried out. It will be noted that FIG. 5 is similar to FIG. 1 but in addition is provided with standpipes 50, 50a, 50b and 50c extending from various levels in the first chamber up through the top of the housing. Since there is a particle size gradient from the top to the bottom of the fluidized bed, it is possible to syphon off any given size particles from the fluidized bed through one of the conduits 50, 50a, 50b and 50c. Small particles introduced at the top of the bed grow larger as they make contact with the parent electrode and reactant material. As their mass increases, they tend to migrate to the bottom of the bed, where they are siphoned off through a standpipe. In this way, metal powders of any given size can be continuously manufactured.

Figure 6:
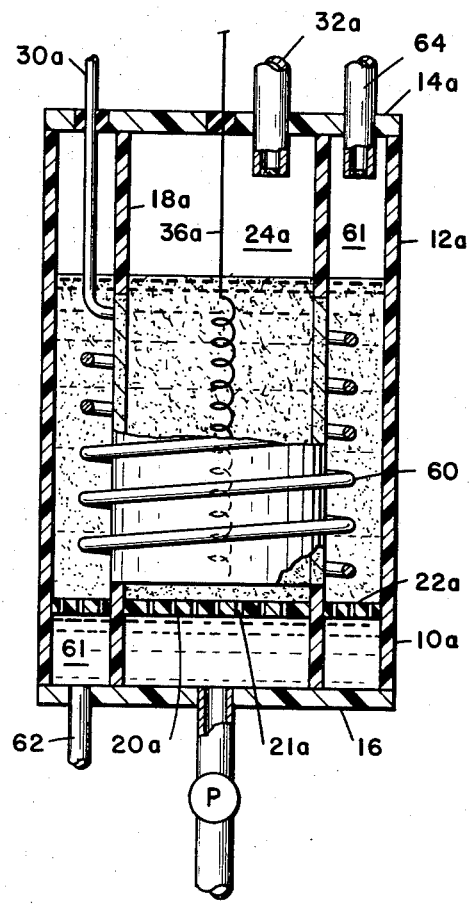
FIG. 6 is a view of a vertical cross-section of a third embodiment of the invention where both electrodes are in fluidized particulate form.

A further embodiment of the invention is illustrated in FIG. 6, wherein the feature of having the counter electrode in particulate form is added. The embodiment of FIG. 6 is in some respects identical to that of FIG. 1 in that elements 10a, 12a, 14a, 16a, 18a, 20a, 22a, 24a, 30a, 32a, and 36a, in FIG. 6 are substantially to identical elements 10, 12, 14, 16, 18, 20, 22, 24, 30, 32, and 36 of FIG. 1. In FIG. 6, ring 22a, as well as bottom 20a are provided with small holes 51a extending therethrough, and inner cylinder 18a is extended to the housing bottom 16a which creates a new chamber 61. A conduit 62 is provided to supply chamber 61 with an electrolyte-reactant system that is independent of the inner chamber electrolyte-reactant system. An outlet conduit 64 is provided for removal of the electrolyte and reaction products from the outer chamber. A counter electrode in helical form 60 is disposed in the outer chamber. In this case, electrical charge passes from the parent electrode to the particulate electrode in the first chamber, then to a reactant ion that transports it through the ion-permeable membrane, where it is transferred to an electrode particle in the outer chamber, and finally to the counter electrode.

The above-described embodiments are illustrative only and should not be construed as limiting the scope of the invention that is now particularly claimed.

We claim:

1. In an electrolytic cell having parent and counter electrodes separated by an ion permeable diaphragm and a wide-area bed of conductive particles surrounding at least a portion of said parent electrode, the method of carrying out electrochemical processes in which current flows between said parent and counter electrodes comprising:

continuously flowing a mixture of electrolyte and electrochemical reactant up through a wide expanse of said bed of conductive particles at a rate sufficient to maintain said bed in a fluidized condition;

passing an external electrical current between said parent and counter electrodes while said mixture is flowing; and recovering the electrochemical products produced by current flow between said conductive particles, said parent electrode and said counter electrode from the overhead effluent stream from said electrolytic cell.

2. In an electrolytic cell having parent and counter electrodes separated by an ion permeable diaphragm and a wide area bed of conductive particles surrounding at least a portion of said parent electrode, the method of producing metal powders in which current flows between said parent and counter electrodes comprising:

continuously flowing a mixture of electrolyte and reactant material through said bed of conductive particles at a rate sufficient to maintain a wide area of said bed in a fluidized condition;

passing an external current between said parent and counter electrodes while said mixture is flowing;

providing a fresh supply of conductive particles; and recovering said conductive particles.

References Cited

UNITED STATES PATENTS

| | | | |
|---|---|---|---|
| 2,586,818 | 2/1952 | Harms | 117—100 |
| 3,354,863 | 11/1967 | Reynolds | 118—62 |
| 521,991 | 1894 | Sachs et al. | 204—10 |
| 1,789,443 | 1/1931 | Levin | 204—201 |
| 1,986,197 | 1/1935 | Harshaw | 204—10 |

FOREIGN PATENTS

| | | | |
|---|---|---|---|
| 176,774 | 4/1966 | U.S.S.R. | 204—222 |

JOHN H. MACK, Primary Examiner

T. TUFARIELLO, Assistant Examiner

U.S. Cl. X.R.

136—86; 204—222, 273, 275